United States Patent [19]

Bourgeois

[11] Patent Number: 5,429,061
[45] Date of Patent: Jul. 4, 1995

[54] CROP SPRAYER GUIDANCE SYSTEM

[76] Inventor: Raymond A. Bourgeois, Ste. 206-1697 Pembina Hwy., Winnipeg, Manitoba, Canada, R3T 2G6

[21] Appl. No.: 105,114

[22] Filed: Aug. 12, 1993

[30] Foreign Application Priority Data

Aug. 18, 1992 [CA] Canada ............... 2076287

[51] Int. Cl.⁶ ........................... A01C 19/00
[52] U.S. Cl. ................... 111/200; 111/903; 111/904; 221/13
[58] Field of Search ........... 406/130; 137/554, 556; 251/326, 329; 111/170, 171, 172, 173, 174, 903-904, 918, 200, 904, 185, 91, 33; 221/13, 131, 105

[56] References Cited

U.S. PATENT DOCUMENTS

| 46,523 | 2/1865 | Doubler . | |
|---|---|---|---|
| 3,888,387 | 6/1975 | Deckler | 111/185 X |
| 3,912,121 | 10/1975 | Steffen | 111/904 X |
| 4,023,707 | 5/1977 | Johnson | 111/33 X |
| 4,106,414 | 8/1978 | Vastag | 111/200 |
| 4,122,974 | 10/1978 | Harbert et al. | 111/904 X |
| 4,516,670 | 5/1985 | Sorensen, Jr. | 111/67 X |
| 4,872,785 | 10/1989 | Schrage et al. | 111/174 X |
| 4,912,681 | 12/1990 | Halsey et al. | 111/200 X |
| 4,930,431 | 6/1990 | Alexander . | |
| 4,949,656 | 8/1990 | Lyle et al. | 111/174 |
| 4,989,524 | 2/1991 | Brown et al. | 111/91 |
| 5,003,894 | 9/1991 | Lafferty . | |
| 5,024,173 | 6/1991 | Deckler . | |
| 5,074,228 | 12/1991 | Daws . | |
| 5,078,066 | 1/1992 | Lafferty . | |

Primary Examiner—Dennis L. Taylor
Assistant Examiner—Robert Pezzuto
Attorney, Agent, or Firm—Murray E. Thrift; Adrian D. Battison; Stanley G. Ade

[57] ABSTRACT

For marking a field with unseeded rows during seeding, the seed box of a seed drill is equipped with a valve unit mounted inside the box for shutting off seed flow to one of the seed cups during selective passes. A control system for the unit allows the shut-off to be automatic, after a selective number of passes have been completed, or manual as selected by the operator, The unseeded rows are used after germination for guiding a crop sprayer so that there will be no spray overlap and no gaps between the sprayer passes.

17 Claims, 5 Drawing Sheets

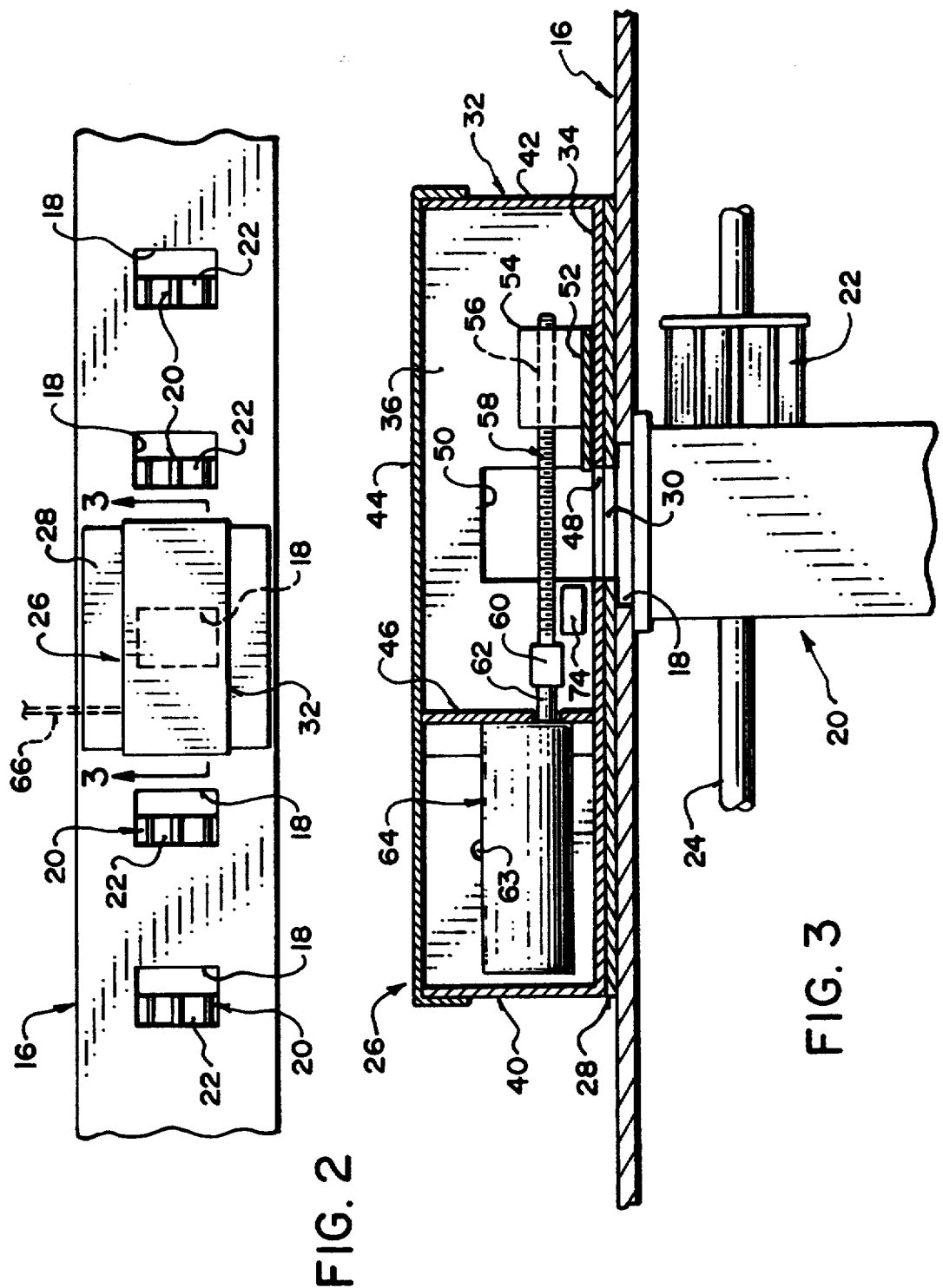

CROP SPRAYER GUIDANCE SYSTEM

FIELD OF THE INVENTION

The present invention relates to field marking.

BACKGROUND

In the spraying of agricultural chemicals, it is important to minimize the double spraying of crops due to overlap off sprayer passes and also to eliminate any gaps between the sprayer passes. To enable this, systems have been developed for dropping markers, for example patches of foam, paper or chalk on a field to designate the edge of a sprayer pass. Other systems use discs that leave a mark on the ground. These systems are all subject to visibility problems, especially where spraying is being done at night, the most common time for such work because of reduced winds.

Another system which has been developed is the "tramline" system that leaves unseeded rows at appropriate intervals along a field to accommodate the tires of a tractor. While this system is effective in that it provides a reliable, highly visible and easy to follow marking in the field, the mechanisms used to achieve the desired result generally include rather complex clutching mechanisms on the drive shaft for the conventional seed flute. It may require a permanent modification of the seed metering drive shaft.

The present invention is concerned with a field marking system that is easily and simply retro-fit into any common seed drill and involves no permanent modification of the seeder.

SUMMARY

According to one aspect of the present invention there is provided a valve unit mountable in a seed box of a seeder to control seed flow therethrough, the valve unit comprising:

base means having an outlet aperture therein;

slide valve means mounted on the base means and including:

a valve plate mounted for sliding movement between an open position adjacent the aperture and a closed position extending across the aperture, valve plate translating means mounted on the base for moving the valve plate between the open and closed positions, and motor means mounted on the base for operating the translating means; and control means for controlling operation of the motor means whereby seed may selectively be omitted from selected rows during planting so as to mark a field.

The control of the seed delivery is entirely inside the seed box, using a simple, easily installed, internal valve unit.

Preferably, the control system may provide automatic control so that a marker row will automatically be omitted after a predetermined number of passes. For manual control, the control mechanism preferably has a display showing the number of passes completed since the last marker row or the number of passes to complete before the next marker row is to be made.

According to another aspect of the present invention there is provided, in a seeder having a transversely elongate seed box with a bottom wall having a plurality of seed dispensing openings spaced therealong, and seed metering and planting means below the seed dispensing openings for planting seed at a predetermined, metered rate, the improvement comprising valve means for selectively closing one of the seed dispensing openings, means mounting the valve means on the bottom wall, inside the seed box, the valve means including a valve plate, means mounting the valve plate for movement in the transverse direction along the seed box between a closed position extending across said one of the seed dispensing openings and an open position located beside the said one of the seed dispensing openings, and motor means for moving the valve plate between the closed and open positions.

By arranging the valve unit to operate transversely, that is along the grain box, the unit may substantially universal and suited to be mounted in almost any manufacturer's seed box. A replaceable base plate mounted on the valve unit housing fits the unit properly into a given seed box.

BRIEF DESCRIPTION OF THE DRAWINGS

In the accompanying drawings, which illustrate an exemplary embodiment of the present invention:

FIG. 2 is a plan view of a seed box with a valve unit installed;

FIG. 3 is a sectional view along line 3—3 of FIG. 2;

DETAILED DESCRIPTION

Figure 1:
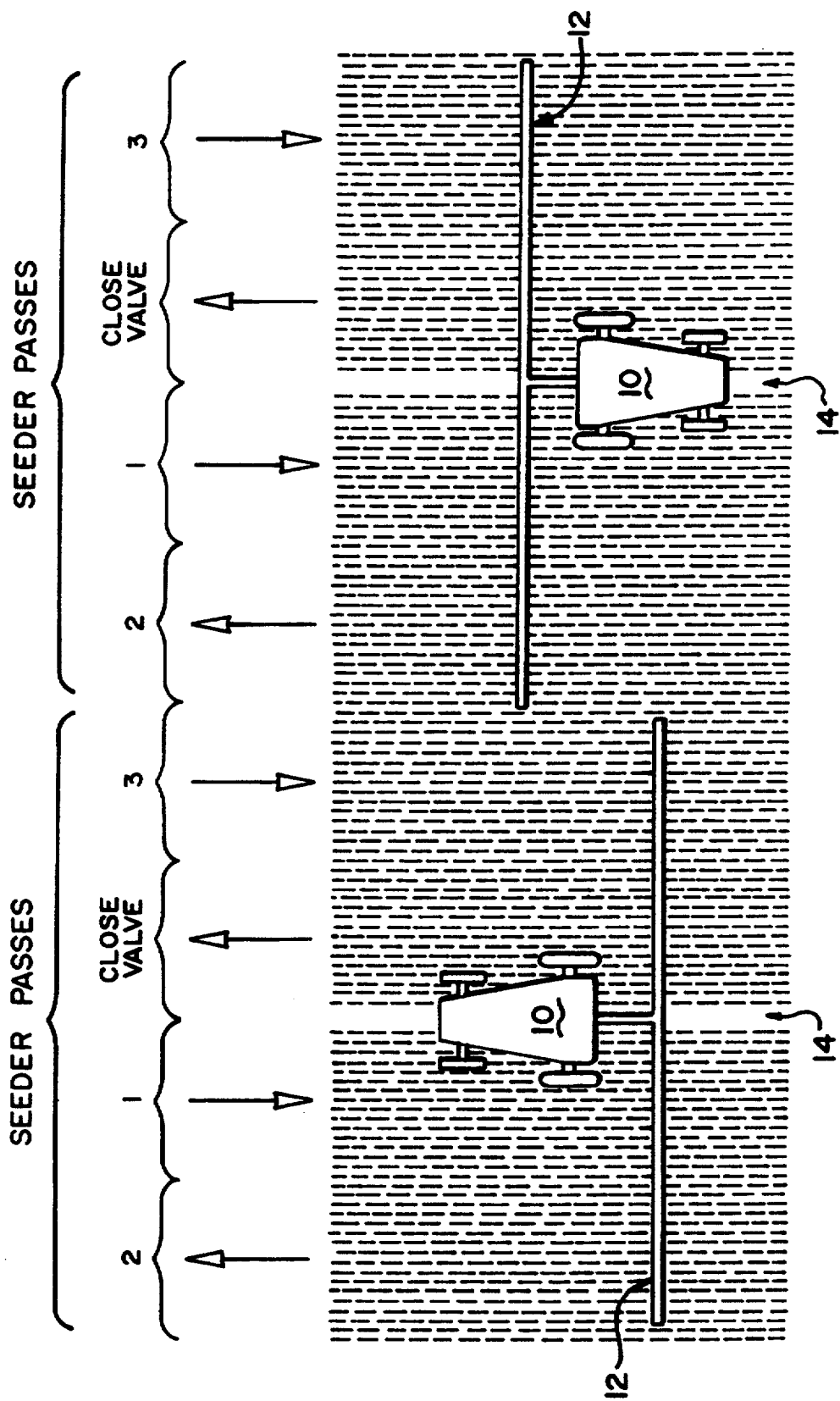
FIG. 1 is a plan view schematically illustrating the theory of operation.
Figure 4:
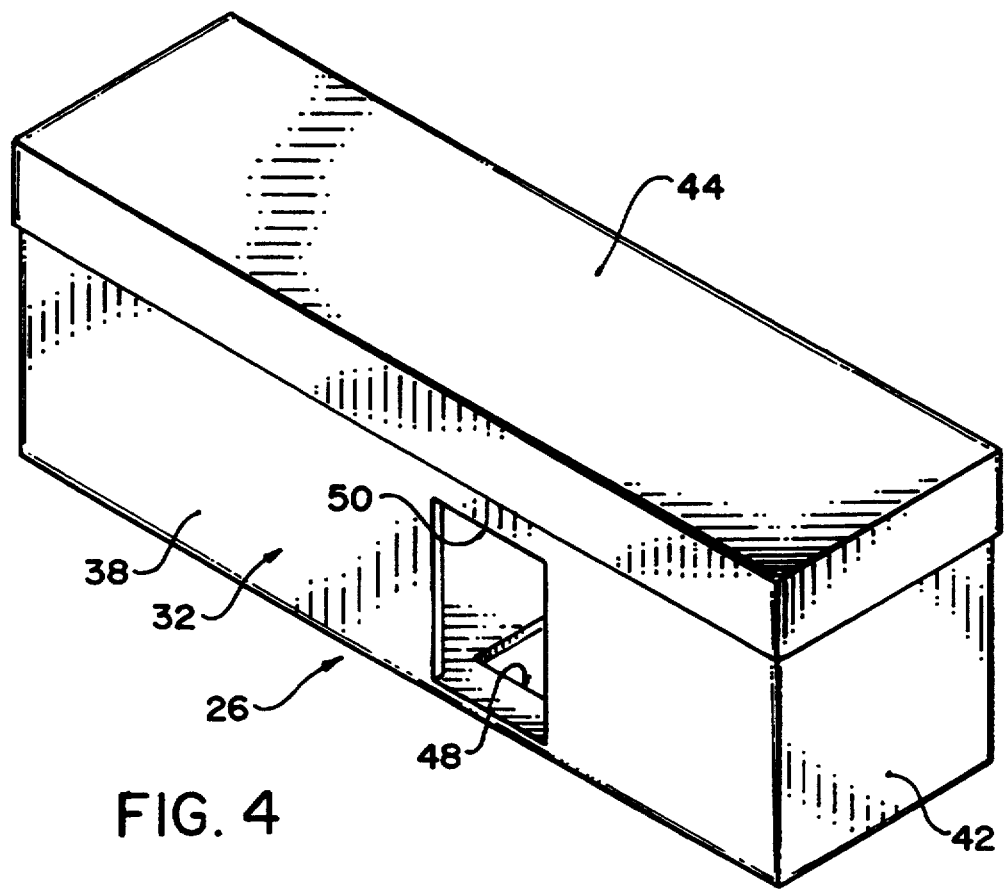
FIG. 4 is an isometric view of the valve unit.
Figure 5:
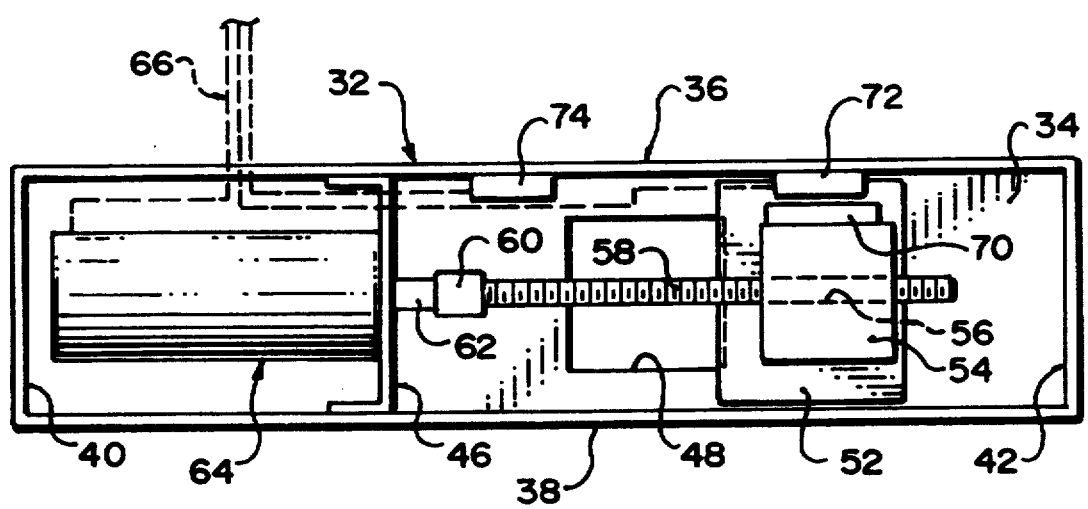
FIG. 5 is a plan view of the valve unit with the cover removed.
Figure 6:
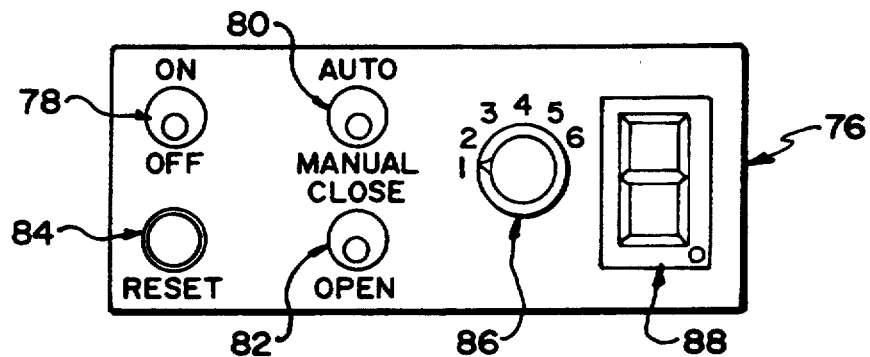
FIG. 6 is a front view of a control unit.

Referring to the accompanying drawings, especially to FIG. 1, there is illustrated a sprayer 10 spraying a field using a boom 12. In this instance, the field has been seeded using a seeder with a 24 foot width. In seeding the field, one row of seed has been omitted on every four passes of the seeder. This leaves marker lines 14 with no crop growth at 96 foot spacings across the field. Since the boom is 96 feet in length, the sprayer 10 may follow the marker lines across the field and cover the complete crop with no overlap or gaps between the boom passes.

FIGS. 2 and 3 illustrate a seed box 16 of a conventional form with a series of seed discharge openings 18 along the bottom wall of the box. Below each discharge opening is a seed meter 20 with the usual flute 22 for metering the seed from the seed box and driven by a transverse drive shaft 24. This structure is conventional.

To shut off the seed flow to one of the seed meters, a valve unit 26 is mounted inside the seed box, on the bottom wall, over one of the seed discharge openings 18. The valve unit has a base plate 28 that extends the full depth of the seed box bottom from back to front. This plate has a seed opening 30 that is in registry with the controlled seed discharge opening 18 of the seeder. Mounted on the base plate is a housing 32. The housing contains all of the working parts of the valve unit and may be removed from the base plate 28 and installed on alternative base plates with different sizes in order to fit the seed boxes of different manufacturers. Thus, the valve unit is "universal" in its application.

The housing 32 has a bottom wall 34, front and back walls 36 and 38 and two side walls 40 and 42. The top side of the housing is closed with a cover 44. Within the housing is a transverse panel 46 separating the interior of the housing into two compartments, arranged side by side.

A seed outlet opening 48 is formed in the bottom wall 34 of the housing and is aligned with the seed opening 30 in the base plate 28 and the respective seed discharge opening 18. The housing itself is oriented with its longest, side to side, dimension extending along the seed box in order to keep the complete valve unit entirely within the seed box and to avoid any need to modify the seed box. Two seed inlets 50 are formed in the front and back walls 36 and 38 in alignment with the seed outlet 48. These are sufficiently large that seed will run into the housing 32 through the inlets 50 and then through the outlet 48 to the seed discharge opening 18.

For closing the seed outlet 48, the housing has, in the same chamber as the outlet 48, a valve plate 52. This is a flat plate lying flush on the top surface of the bottom wall 34 of the housing.

The valve plate 52 carries a block 54 with a threaded bore 56 extending side to side in the housing. A threaded rod 58 is screwed into the bore 56 and is connected by a shaft coupling 60 to a motor output shaft 62 adjacent the transverse wall 46. The shaft extends through an opening in the wall to the second compartment, where its motor 64 is located. The wiring 66 for the motor 64 is let out of the housing through an opening 68 in the back wall. Operation of the motor rotates the threaded rod 58 and thus translates the valve plate back and forth in the housing to open or close the seed outlet 48.

The block 54 on the valve plate carries a magnet 70. This actuates two magnetic limit switches 72 and 74 inside the housing, with switch 72 being actuated when the valve is fully open and switch 74 being actuated when the valve is fully closed. The leads from the switches extend through the transverse wall 46 into the motor compartment and are brought out to the control system as part of the wiring 66.

The apparatus includes a console 76 that is mounted in the cab of the tractor pulling the seeder. The console has an off/on power switch 78 for turning the unit on and off. An automatic-manual switch 80 selects either automatic operation in which the unit operates automatically to shut off seed delivery after a set number of passes or operates in a manual mode controlled entirely by the operator using close-open switch 82. A reset switch 84 is used to reset the system to its initial condition or in conjunction with a multi position select switch 86 to set a new set of initial conditions. A single digit display 88 is also located on the console. It is a seven segment LED display with an additional decimal point.

Figure 7:
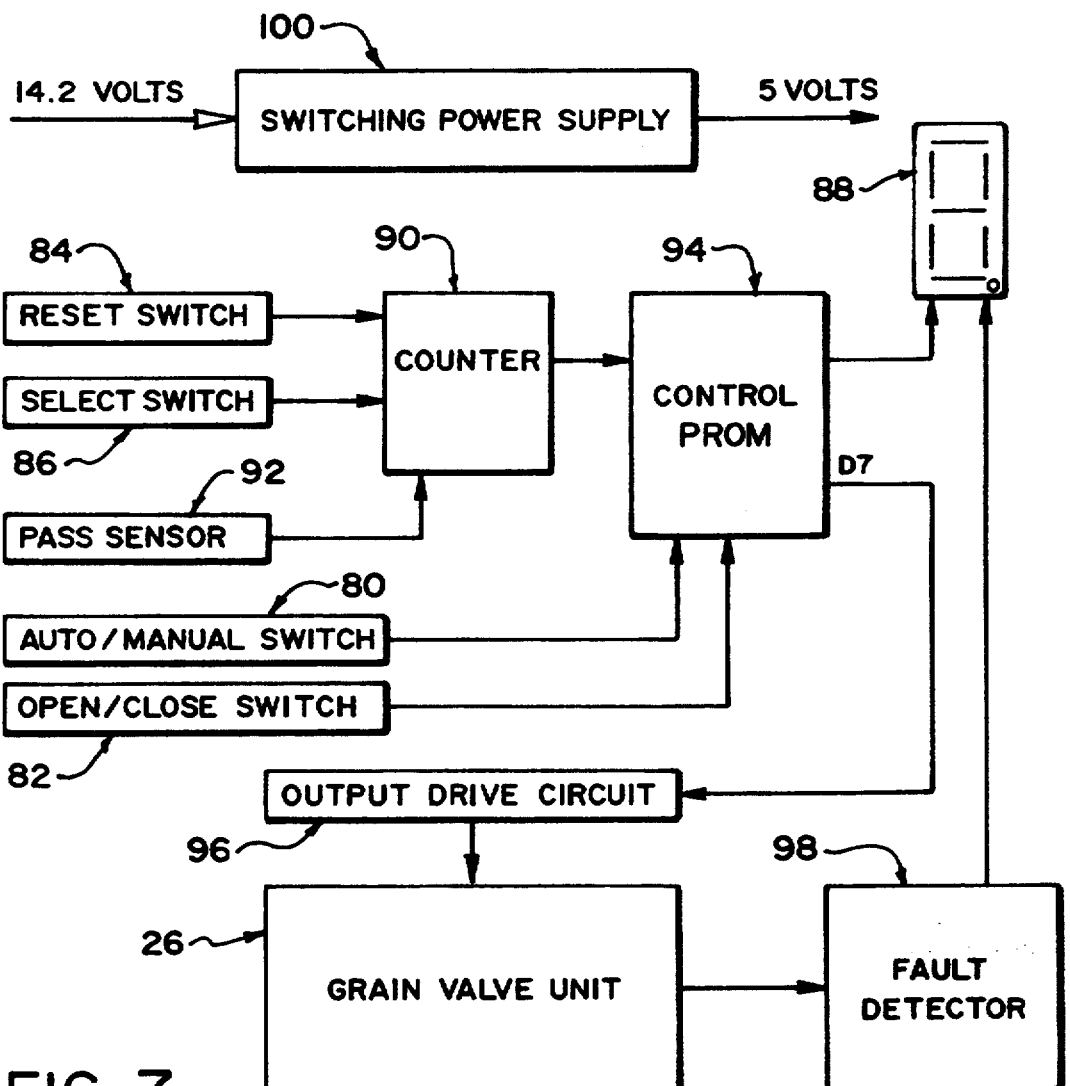
FIG. 7 is a control unit schematic block diagram.

The basic arrangement of the control system is illustrated in FIG. 7. As shown in that figure, a counter 90 receives input from the reset switch 84, the select switch 86 and a pass sensor switch 92. The pass sensor switch is a magnetic switch located on a stationary part of the seeder. It is actuated by a magnet on a pan of the seeder, for example the seed box, that is raised at the end of a pass in order to turn the tractor and seeder for a return pass across the field. The counter output is passed to a control programmable read only memory (PROM) 94 which also receives input from the automatic-manual switch 80 and the closed-open switch 82. The control PROM delivers output to an output drive circuit 96 for driving the motor 64 of the valve unit and to the display 88. The two switches 72 and 74 of the valve unit 26 output to a fault detector 98 which is also coupled to the display 88 to provide a fault signal to the display.

The control system is supplied with operating power from the switching power supply 100. This power supply takes the incoming +14.2 volts from the tractor battery and outputs +5 volts for the control circuit. A switching regulator is particularly suited for the present unit because of its efficiency and size.

Figure 8:
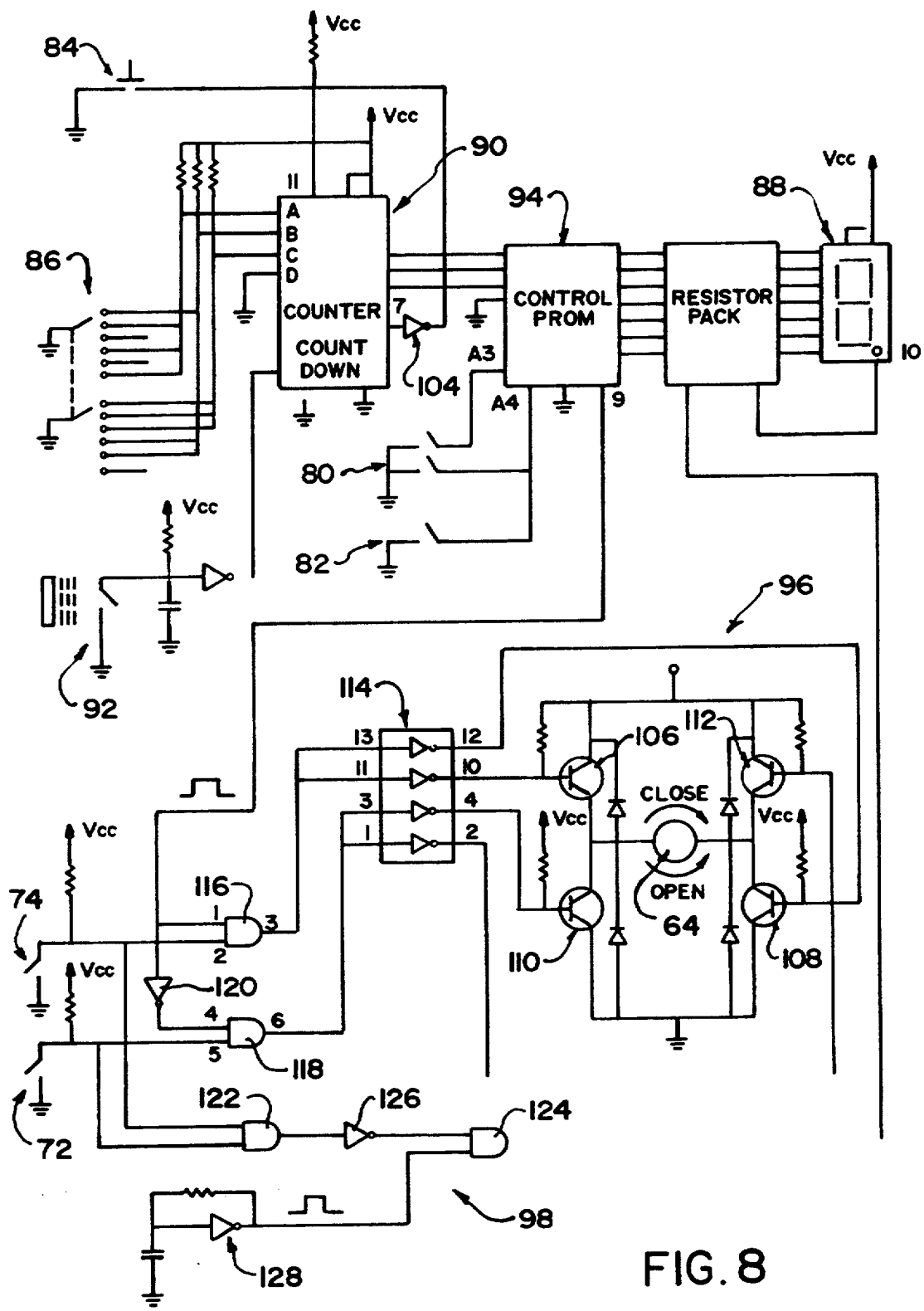
FIG. 8 is a control schematic.

The detailed schematic of the controls is illustrated in FIG. 8.

As illustrated in that Figure, the selector switch 86 is a double pole, six throw switch connected to pins A, B, C of the counter 90 which is, in this embodiment, a 74LS192 counter. The input configuration of the pass select switch is as follows:

| Position | C | B | A |
|---|---|---|---|
| 1 | 0 | 0 | 1 |
| 2 | 0 | 1 | 0 |
| 3 | 0 | 1 | 1 |
| 4 | 1 | 0 | 0 |
| 5 | 1 | 0 | 1 |
| 6 | 1 | 1 | 0 |

In operation, the input select switch 86 is first set by the operator to the required number of passes for a particular seeder/sprayer width combination. This selection is then loaded into the counter 90 using the reset switch 84.

Once the pass selection has been loaded into the counter, the operator begins seeding along the field. At the end of one pass, the seeder is raised and lowered again for the next pass. The normally open pass sensor switch 92 detects this and generates a low pulse when it closes. The pulse is inverted and sent as a positive going pulse to the count down input pin of the counter 90. The counter then counts down by one indicating that the seeder has completed one pass. The process continues until the counter reaches a count of zero. At this point, the grain valve 52 closes, blocking the flow of grain in one particular row. Once the operator has completed pass zero, the next raising and lowering of the seeder will force the counter 90 to go to a binary 9 output. Pin 7 of the counter 90 is the most significant bit and this is fed to a Schmitt inverter 104. The output of the inverter is then fed to the load input of the counter on pin 11. This resets the counter to the original pass selection. The whole process keeps repeating as the seeding progresses, pass after pass.

The output control PROM 94 takes information from counter 90 and the double pole double throw automatic-manual switch 80, and outputs the required drive signals for the LED display 88 and the valve unit 26. The PROM 94 is based on Texas Instruments TBP18S030, 32 by 8 Bit word PROM. The 32 words are divided into four memory areas:

1. Words 0–7 are dedicated to the automatic mode of operation;
2. Words 8–15 are dedicated to the manual "close valve" operation;
3. Words 16–23 are not used; and
4. Words 24–34 are dedicated to the manual "open valve" operation.

In the automatic mode of operation, address bits A3 and A4 are set to zero. Thus only the first 8 words are selected. The PROM 94 then takes the output signals from the counter 90 and from this, determines which of the 8 words should be selected. One word is dedicated to each possible pass selection (i.e. 1, 2, 3, 4, 5 or 6) and one word is dedicated to the 'close valve' operation. Word 7 is not used. Depending on which word is selected, either the output data line 7 will be Hi or Lo. This line is used to turn the Output Drive Circuitry either on or off, which corresponds to the seed valve being either closed or open. Output data lines D0 to D6 are used to drive the 7-segment LED display 88. This LED indicates at which pass the operator is at (in which case the grain valve is still open), or it indicates that the grain valve is closed (i.e. during the pass zero).

In the manual mode of operation, either words 8 to 15 or words 24 to 31 are selected. Address bit A3 is held Hi during this time by the automatic-manual switch 80, in order to accomplish this. If the close valve operation is chosen with switch 82, then address bit A4 is held Lo, thereby choosing words 8 to 15. The output on D7, pin 9 will go Hi to signal the output drive circuit 96 to close the valve. The LED display 88 will show a 'C' to indicate this. If on the other hand the open valve operation is chosen, address bit A4 is held Hi, thereby choosing words 24 to 31. The output on D7, pin 9 will now go Lo, signalling to the output drive circuit 96 to open the grain valve. The LED display 88 will now show 'O' to indicate this.

The drive circuit 96 provides the necessary voltage, at the proper polarity, to the D.C. motor 64 in the valve 26 in order to open or close the valve. It consists of four transistors 106, 108, 110 and 112, a 7406 output inverter chip 114, two NAND gates 116 and 118 and the two limit switches 72 and 74 of the valve unit. It operates as follows:

When pin 9 of the control PROM 94 goes Hi, indicating that the motor is to close the grain valve, the output on pin 3 of NAND gate 116 goes Lo. This Lo signal is fed to pins 11 and 13 of the inverter chip 114, forcing the outputs on pin 12 and 10 to go Hi. This turns transistors 106 and 108 on hard (i.e. saturation), forcing current to flow through the motor. The motor, which is connected to the seed valve via the grain valve shaft, begins to rotate clockwise, which forces the grain valve to start closing. When the grain valve has reached the end of its required travel, the fully closed limit switch 74 of the valve unit closes, forcing a Lo signal on pin 2 of NAND gate 16. This causes the output to go Hi, which in turn forces the outputs on pins 12 and 10 of the chip 114 to go Lo. The transistors 106 and 108 are then cut off and the motor stops rotation. When the seed valve starts to close, the fully open limit switch 72 opens up, forcing a Hi level on pin 5 of NAND gate 118.

When the valve opens up again, pin 9 of the Control PROM 94 goes Lo. This Lo signal gets inverted by a Schmitt inverter 120, and gets fed to pin 4 of NAND gate 118. Since open switch 72 is still open, a Hi level is present on pin 5 of NAND gate 118. Thus, the output of the NAND gate goes Lo, gets inverted by the inverter chip 114, and turns transistors 110 and 112 on. Current now flows in the opposite direction through the motor, forcing it to rate counterclockwise. The valve then begins to open up. When it reaches the end of its required travel, the fully open limit switch 72 closes, forcing a Lo level on pin 5 of NAND gate 118. The output of the NAND gate then goes Hi, gets inverted by chip 114, and cuts off transistors 110 and 112. The motor then comes to a stop. When the valve starts to open, the fully closed switch 74 opens up, forcing a Hi level on pin 2 of NAND gate 116. Thus the circuit is ready for the next time when the output on pin 9 of the control PROM 94 goes Hi. This indicates that it is time to close the valve again, and the whole process repeats itself.

The fault detection circuit 98 alerts the operator that something is wrong with the valve unit. This could be a jammed grain valve, an improperly seated grain valve or a broken connection along the wiring harness. The circuit consists of two NAND gates 122 and 124, and inverter 126 and an oscillator 128.

Whenever both limit switches are open, the output of NAND gate 122 goes Lo. This Lo level gets inverted by inverter 126, which is fed to pin 10 of NAND gate 124. This NAND gate acts as a "front door" for the oscillator output. When pin 10 is at a Hi level, the oscillator signal is fed through to the output. This output then goes to pin 10 of the 7-segment LED 88, which corresponds to the decimal point. Thus if both pins 12 and 13 of NAND gate 122 are Hi, indicating a malfunction, the decimal point on the LED 88 will begin to flash at approximately 4 hertz. This will alert the operator that something has gone wrong. When the grain valve is either closing or opening, both limit switches will be open for approximately four seconds. Thus a flashing LED at the end of a pass does not indicate an error. It merely indicates that the motor is presently running.

While one particular embodiment of the present invention has been described in the foregoing it is to be understood that other embodiments are possible within the scope of the invention. For example, the valve plate 52 may be mounted in nylon the like glides above the base plate 28 to avoid jamming of some sizes of seed. The valve unit may be mounted to eliminate seed rows that coincide with the left wheel of the tractor during spraying operations, rather than the centre of the tractor. Other modifications will be apparent to those skilled in the art. The invention is thus to be considered limited solely by the scope of the appended claims.

I claim:

1. A valve unit mountable in a seed box of a seeder to control seed flow therethrough, the valve unit comprising:
    base means having an outlet aperture therein, the base means comprising a housing with a bottom wall, front and back walls, two side walls and a cover, the front and back walls having openings therein for receiving seed from the seed box;
    slide valve means mounted on the base means and including:
        a valve plate mounted for sliding movement between an open position adjacent the aperture and a closed position extending across the aperture,
        valve plate translating means mounted on the base for moving the valve plate between the open and closed positions, and
        motor means mounted on the base for operating the translating means; and
    control means for controlling operation of the motor means whereby seed may selectively be omitted from selected rows during planting so as to mark a field.

2. A valve unit according to claim 1 wherein the motor means are enclosed by the housing.

3. A valve unit mountable in a seed box of a seeder to control seed flow therethrough, the valve unit comprising:

base means having an outlet aperture therein, the base means comprising a housing with a bottom wall, front and back walls, two side walls and a cover, the front and back walls having openings therein for receiving seed from the seed box;

a base plate secured to the bottom wall of the housing, the base plate conforming in depth to that of the bottom wall of the seed box;

slide valve means mounted on the base means and including:

a valve plate mounted for sliding movement between an open position adjacent the aperture and a closed position extending across the aperture, valve plate translating means mounted on the base for moving the valve plate between the open and closed positions, and motor means mounted on the base for operating the translating means; and control means for controlling operation of the motor means whereby seed may selectively be omitted from selected rows during planting so as to mark a field.

4. A valve unit mountable in a seed box of a seeder to control seed flow therethrough, the valve unit comprising:

base means having an outlet aperture therein;

slide valve means mounted on the base means and including:

a valve plate mounted for sliding movement between an open position adjacent the aperture and a closed position extending across the aperture, valve plate translating means mounted on the base for moving the valve plate between the open and closed positions, and motor means mounted on the base for operating the translating means; and control means for controlling operation of the motor means whereby seed may selectively be omitted from selected rows during planting so as to mark a field, the control means including a pass sensor means responsive to raising of the seeder for generating a pass signal.

5. A valve unit according to claim 4 wherein the control means include means for receiving pass signals, means for counting the pass signals and means for actuating the motor means to move the valve plate to the closed position in response to the number of pass signals equalling a predetermined number of pass signals.

6. A valve unit according to claim 5 including preselect means manually operable to select the predetermined number of pass signals.

7. A valve unit according to claim 5 including reset means for resetting the number of passes counted to zero.

8. A valve unit according to claim 5 wherein the control means include means for displaying the number of pass signals received in response to operation of the means for counting the pass signals.

9. A valve unit according to claim 8 including switch means manually actuable to operate the motor means to move the valve plate between the open and closed positions.

10. In a seeder having a transversely elongate seed box with a bottom wall having a plurality of seed dispensing openings spaced therealong, and seed metering and planting means below the seed dispensing openings for planting seed at a predetermined, metered rate, the improvement comprising valve means for selectively closing one of the seed dispensing openings, means mounting the valve means on the bottom wall, inside the seed box, the valve means including a valve plate, means mounting the valve plate for movement in the transverse direction along the seed box between a closed position extending across said one of the seed dispensing openings and an open position located beside the said one of the seed dispensing openings, and motor means for moving the valve plate between the closed and open positions.

11. A seeder according claim 10 including valve plate limit switch means mounted on the base means for generating signals representing the position of the valve plate when in the open and the closed positions.

12. A seeder according to claim 11 including fault signal means responsive to actuation of either of the valve plate limit switches to generate a fault signal.

13. A seeder according to claim 11 wherein the limit switch means comprise magnetic switches.

14. A seeder according to claim 12 including display means for visually displaying the presence of a fault signal.

15. A seeder according to claim 10 wherein the valve means include a housing enclosing the motor means and on which the valve plate is mounted.

16. A seeder according to claim 15 wherein the housing includes a base unit including a bottom wall, a seed outlet opening in the bottom wall, front and back walls and two end walls, a cover unit over the base unit and seed inlet openings on the front and back walls.

17. A seeder according to claim 16 including a base plate on which the bottom wall of the base unit is mounted, the base plate matching the bottom wall of the seed box in front to back dimension and having an opening therethrough aligned with the seed outlet opening of the base unit.

* * * * *